(12) United States Patent
Shukla et al.

(10) Patent No.: US 12,724,549 B2
(45) Date of Patent: Sep. 1, 2026

(54) SELECTIVE DATA CORRUPTION BEFORE ACTUAL ERASE OPERATION FOR DATA SECURITY

(71) Applicant: Microchip Technology Incorporated, Chandler, AZ (US)

(72) Inventors: Pitamber Shukla, San Jose, CA (US); Nian Niles Yang, Mountain View, CA (US); Achyut Chandulal Gedia, Los Gatos, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 19/032,050

(22) Filed: Jan. 18, 2025

(65) Prior Publication Data

US 2025/0355578 A1 Nov. 20, 2025

Related U.S. Application Data

(60) Provisional application No. 63/649,941, filed on May 20, 2024.

(51) Int. Cl.
*G06F 3/06* (2006.01)

(52) U.S. Cl.
CPC .......... *G06F 3/0623* (2013.01); *G06F 3/0652* (2013.01); *G06F 3/0659* (2013.01); *G06F 3/0679* (2013.01)

(58) Field of Classification Search
None
See application file for complete search history.

(56) References Cited

U.S. PATENT DOCUMENTS

2012/0278564 A1* 11/2012 Goss ....................... G06F 12/00 711/155
2013/0036253 A1* 2/2013 Baltar ................. G11C 11/5628 711/E12.001
2017/0169883 A1* 6/2017 Kwon .................... G11C 16/28
2018/0108419 A1 4/2018 Lin
2019/0088338 A1 3/2019 Iwai et al.
2020/0135277 A1 4/2020 Luo et al.
2024/0181497 A1* 6/2024 Chiu ..................... B06B 1/0611

OTHER PUBLICATIONS

International Search and Written Opinion, PCT Application No. PCT/US2025/030270, mailed Aug. 1, 2025, 11 pages.

* cited by examiner

*Primary Examiner* — Brian R Peugh
(74) *Attorney, Agent, or Firm* — Hovey Williams LLP

(57) ABSTRACT

In some implementations, a controller may receive a command to perform an erase operation to erase data stored in a block of a non-volatile memory device. The controller may determine a size of the data identified by the command. The controller may provide, based on the size of the data, a programming pulse to a location, of the block, that stores the data, wherein the programming pulse is provided to write predetermined data at the location. The controller may perform an erase operation on the block after writing the predetermined data.

20 Claims, 6 Drawing Sheets

SELECTIVE DATA CORRUPTION BEFORE ACTUAL ERASE OPERATION FOR DATA SECURITY

RELATED APPLICATION

This application claims priority to U.S. Provisional Patent Application No. 63/649,941 entitled "PROGRAMMING PULSE FOR DATA TO BE ERASED," filed May 20, 2024, which is incorporated herein by reference in its entirety.

FIELD

The present disclosure generally relates to operations performed on a non-volatile memory device and, for example, to performing an erase operation on the non-volatile memory device.

BACKGROUND

A non-volatile memory device may include a memory device that may store and retain data without external power supply. One example of a non-volatile memory device is a NAND flash memory device, such as a solid state drive (SSD). The SSD may store data that is used by a host computing device. A controller of the SSD may maintain a table that maps logical block addresses (associated with the host computing device) to physical block addresses (of the SSD). The table may be referred to as a logical to physical (L2P) table. The L2P table may be updated based on erase operations performed on the non-volatile memory device.

SUMMARY

A method comprising: receiving a command to perform an erase operation to erase data stored in a block of a non-volatile memory device; determining a size of the data identified by the command; providing, based on the size of the data, a programming pulse to a location, of the block, that stores the data, wherein the programming pulse is provided to write predetermined data at the location; and performing an erase operation on the block after writing the predetermined data.

A system comprising: a controller, of a non-volatile memory device, to: receive a command to perform an erase operation to erase data stored in a block of a non-volatile memory device; determine a size of the data identified by the command; and provide, based on the size of the data, a programming pulse to a location, of the block, that stores the data, wherein the programming pulse is provided to write predetermined data at the location.

A non-transitory computer-readable medium storing a set of instructions, the set of instructions comprising: one or more instructions that, when executed by one or more processors of a controller, cause the controller to: determine a size of data to be erased, wherein the data is stored in a block of a non-volatile memory device and identified by a command; and provide, based on the size of the data, a programming pulse to a location, of the block, that stores the data, wherein the programming pulse is provided to write predetermined data at the location based on a command to perform an erase operation at the location of the block

DETAILED DESCRIPTION

Figure 1:
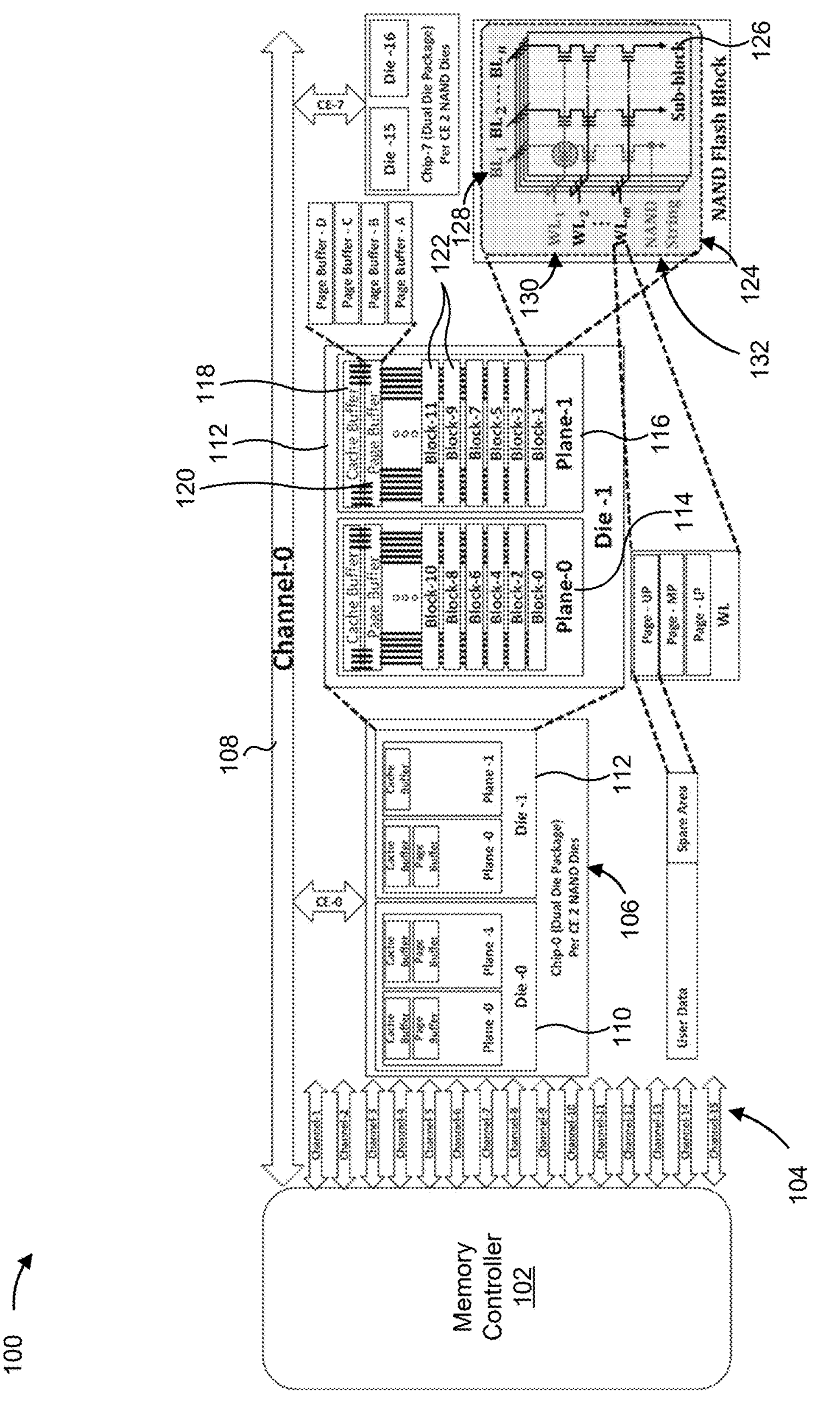
FIG. 1 is a block diagram illustrating an example NAND flash memory system, in accordance with the present disclosure.

The following detailed description of example implementations refers to the accompanying drawings. The same reference numbers in different drawings may identify the same or similar elements.

A solid state drive (SSD) may include a controller and a non-volatile memory device, such as a NAND flash memory device. The SSD may store data that is used by a host device (e.g., a host computing device). The data may be stored in blocks (also referred to as memory blocks) of the non-volatile memory device. A controller of the SSD may maintain a table that maps logical block addresses (associated with the host computing device) to physical block addresses (of blocks of the SSD). The table may be referred to as a logical to physical (L2P) table. The L2P table may be updated as different operations are performed on the non-volatile memory device, such as write operations or erase operations.

The controller may receive, from the host device, a command to perform an erase operation on the non-volatile memory device. As an example, the host device may provide the command to erase data from a block of the non-volatile memory device. The data may also be referred to as a "data chunk," which may refer to a portion of data stored on the block.

In the prior art, based on the command, the controller merely performs an update on the L2P table to remove information regarding the data (or data chunk), thereby preventing the data from being accessed (e.g., for a read operation). In other words, the controller may perform the update on the L2P table to discard the data. Once the update has been performed (e.g., once the data is discarded or has become unusable), the block may be placed in a queue for blocks that are to be erased.

Notwithstanding the foregoing actions to erase and discard the data chunk, during the update on the L2P update and the actual erase operation (after the block has been placed in the queue), the data (or data chunk) may be subject to unauthorized access. In other words, the data may be hacked. Such unauthorized access may lead to unintended results.

The data may be subject to unauthorized access because an erase operation consumes a considerable amount of time. The erase operation may be delayed, thereby subjecting the data to the unauthorized access. Furthermore, the data may be subject to unauthorized access since the update to the L2P table and placing the block in the queue may not actually erase the data from the non-volatile memory device. A third party may acquire the non-volatile memory device and may attempt to access any data stored on the non-volatile memory device. Accordingly, the prior art creates a technical problem of allowing unauthorized access to data erased from the non-volatile memory device after an erase operation to erase the data.

Implementations described herein provide a technical solution to the technical problem of allowing unauthorized access to data erased from a non-volatile memory device of an SSD. For example, implementations described herein may ensure that a controller will be able to perform on demand selective data corruption at any stage of a lifetime of a non-volatile memory device to avoid potential data hacking.

With respect to the selective data corruption, in some examples, in addition to updating the L2P table, the controller may also send a programming pulse to the data to be erased (e.g., a frame of data or a data chunk) to corrupt the data so that the data is not recoverable by a hacker. The programming pulse may be performed using single-level cell (SLC), multi-level cell (MLC), triple-level cell (TLC), quad-level cell (QLC), or penta-level cell (PLC). As an example, the selective data corruption may be performed using an SLC "0" pattern using a single pulse without a verify programming operation (also referred to as a "program verify operation"). As used herein, a verify programming operation may refer to an operation for verifying an accuracy and integrity of data programmed (or written) to a cell. For example, after the data is programmed (or written) to the cell, the controller may read the data to verify that the read data matches the data that was originally stored. Implementations described herein may use different patterns.

Performing selective data corruption on any block of the non-volatile device before an actual erase operation improves data security without compromising the lifetime of the SSD. Implementations described herein enable the data, stored in a block, to not be subject to unauthorized access at any stage (e.g., either during an active SSD usage or even during an SSD recycling phase).

FIG. 1 illustrates a block diagram of an example NAND flash memory system 100, in accordance with the present disclosure. The NAND flash memory system 100 may include various components that work together to store, retrieve, and manage data in a non-volatile manner.

The NAND flash memory system 100 includes a memory controller 102. The memory controller 102 may be a hardware component, such as an application-specific integrated circuit (ASIC), or a combination of hardware and software, that manages the flow of data between a host device (not shown) and the NAND flash memory. In some aspects, the memory controller 102 may execute firmware to perform various operations, including wear leveling, garbage collection, and error correction. The memory controller 102 may also maintain the L2P table, which maps logical addresses used by the host device to physical addresses in the NAND flash memory.

Connected to the memory controller 102 is a channel interface 104. The channel interface 104 may serve as a communication pathway between the memory controller 102 and one or more NAND chips 106. In some implementations, the channel interface 104 may include multiple channels, allowing for parallel data transfer and improved performance. For example, the system may include channel 0 108, which is shown in detail, as well as additional channels not explicitly depicted in the figure.

Each NAND chip 106 may contain multiple NAND dies, such as NAND die 0 110 and NAND die 1 112. A NAND die may be a silicon chip that contains the actual memory cells and associated circuitry. In some aspects, each NAND die may be further divided into planes, as illustrated by plane 0 114 and plane 1 116. The use of multiple dies and planes allows for increased parallelism in read and write operations, potentially improving the overall performance of the memory system.

Within each plane, there may be cache buffers 118 and page buffers 120. The cache buffer 118 may serve as a temporary storage area for data being written to or read from the NAND flash memory. It may allow for faster data transfer between the memory controller 102 and the NAND flash memory. The page buffer 120, on the other hand, may hold data that is being programmed into or read from a specific page of the NAND flash memory. In some implementations, the page buffer 120 may be used to perform operations such as read-modify-write, where only a portion of a page needs to be updated.

The planes may contain multiple NAND flash blocks 122. A NAND flash block, such as NAND flash block 124, may be the smallest erasable unit in the NAND flash memory. Each block may be further divided into sub-blocks 126. The sub-blocks 126 may allow for more granular management of the memory, potentially improving wear leveling and garbage collection processes.

Within each NAND flash block 124, the memory cells may be arranged in a grid-like structure formed by bit lines 128 and word lines 130. The intersection of a bit line and a word line may define the location of a specific memory cell. In some aspects, the memory cells in a single column may be connected in series to form a NAND string 132. This arrangement allows for high-density storage but also introduces complexities in reading and writing data.

In alternative embodiments, the NAND flash memory system 100 may incorporate different types of memory cells. For example, instead of traditional floating-gate transistors, some implementations may use charge trap flash (CTF) or 3D NAND structures. These alternative technologies may offer benefits such as improved endurance, higher storage density, or lower power consumption.

The NAND flash memory system 100 may support various data protection mechanisms. For instance, the memory controller 102 may implement error-correcting code (ECC) algorithms to detect and correct bit errors that may occur during read operations. Additionally, the system may employ data scrambling techniques to distribute wear more evenly across the memory cells and reduce the likelihood of data retention issues.

In some implementations, the NAND flash memory system 100 may include support for multiple levels of storage in each memory cell. While single-level cell (SLC) configurations store one bit per cell, multi-level cell (MLC), triple-level cell (TLC), or quad-level cell (QLC) configurations may store two, three, or four bits per cell, respectively. These higher-density storage options may offer increased capacity at the cost of potentially reduced performance and endurance.

The memory controller 102 may also implement advanced features such as bad block management and read disturb management. Bad block management may involve identifying and marking blocks that have become unreliable, ensuring that data is not written to these locations. Read disturb management may involve monitoring and mitigating the effects of repeated read operations on nearby cells, which can cause unintended changes in their stored values over time.

Figure 2:
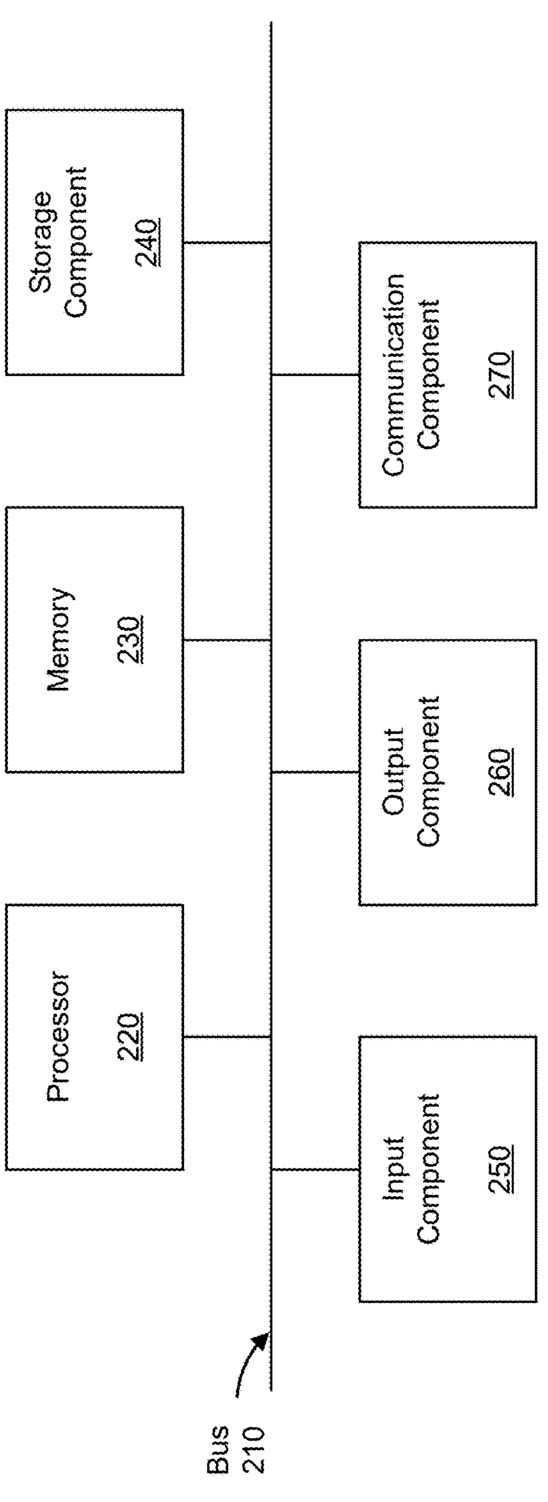
FIG. 2 is a diagram of example components of a device, in accordance with the present disclosure.

FIG. 2 is a diagram of example components of a device 200, which may correspond to one or more devices of FIG. 1, such as a controller or a host device discussed herein. In some implementations, the controller or the host device may include one or more devices 200 and one or more components of the device 200. As shown in FIG. 2, the device 200 may include a bus 210, a processor 220, a memory 230, a storage component 240, an input component 250, an output component 260, and a communication component 270.

The bus 210 includes a component that enables wired or wireless communication among the components of device 200. The processor 220 includes a central processing unit, a graphics processing unit, a microprocessor, a controller, a microcontroller, a digital signal processor, a field-programmable gate array, an application-specific integrated circuit, or another type of processing component. The processor 220 is implemented in hardware, firmware, or a combination of hardware and software. In some implementations, the processor 220 includes one or more processors capable of being programmed to perform a function. The memory 230 includes a random access memory, a read only memory, or another type of memory (e.g., a flash memory, a magnetic memory, or an optical memory).

The storage component 240 stores information or software related to the operation of the device 200. For example, the storage component 240 may include a hard disk drive, a magnetic disk drive, an optical disk drive, a solid state disk drive, a compact disc, a digital versatile disc, or another type of non-transitory computer-readable medium. The input component 250 enables the device 200 to receive input, such as user input or sensed inputs. For example, the input component 250 may include a touch screen, a keyboard, a keypad, a mouse, a button, a microphone, a switch, a sensor, a global positioning system component, an accelerometer, a gyroscope, or an actuator. The output component 260 enables the device 200 to provide output, such as via a display, a speaker, or one or more light-emitting diodes. The communication component 270 enables the device 200 to communicate with other devices, such as via a wired connection or a wireless connection. For example, the communication component 270 may include a receiver, a transmitter, a transceiver, a modem, a network interface card, or an antenna.

The device 200 may perform one or more processes described herein. For example, a non-transitory computer-readable medium (e.g., the memory 230 or the storage component 240) may store a set of instructions (e.g., one or more instructions, code, software code, or program code) for execution by the processor 220. The processor 220 may execute the set of instructions to perform one or more processes described herein. In some implementations, execution of the set of instructions, by one or more processors 220, causes the one or more processors 220 or the device 200 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 2 are provided as an example. The device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

In non-volatile memory systems, such as NAND flash memory devices, data security remains a critical concern, particularly when it comes to erasing sensitive information. Traditional erase operations may not provide adequate protection against unauthorized access to discarded data, potentially exposing users to security risks. This vulnerability arises from the time gap between when an erase command is issued and when the actual physical erasure occurs, as well as from the possibility of data recovery even after conventional erase procedures.

To address these security challenges, implementations described herein provide an approach to data erasure in non-volatile memory devices. This method involves selective data corruption, which goes beyond simply updating the L2P table to mark data as erased. By applying a programming pulse to the specific data chunks marked for erasure, the system actively corrupts the data at the physical level. This corruption process may be tailored to the size and location of the data, utilizing techniques such as single-level cell (SLC) programming, zone-based flash write operations, or full block write operations as appropriate.

The selective data corruption technique offers several advantages over traditional erase methods. It provides immediate protection against unauthorized data access, even before the physical erase operation is completed. This approach also enhances security during the entire lifecycle of the storage device, including during active use and potential recycling phases. By implementing this method, non-volatile memory systems can significantly reduce the risk of data breaches and unauthorized information retrieval, thereby addressing a crucial security gap in existing storage technologies.

Figure 3:
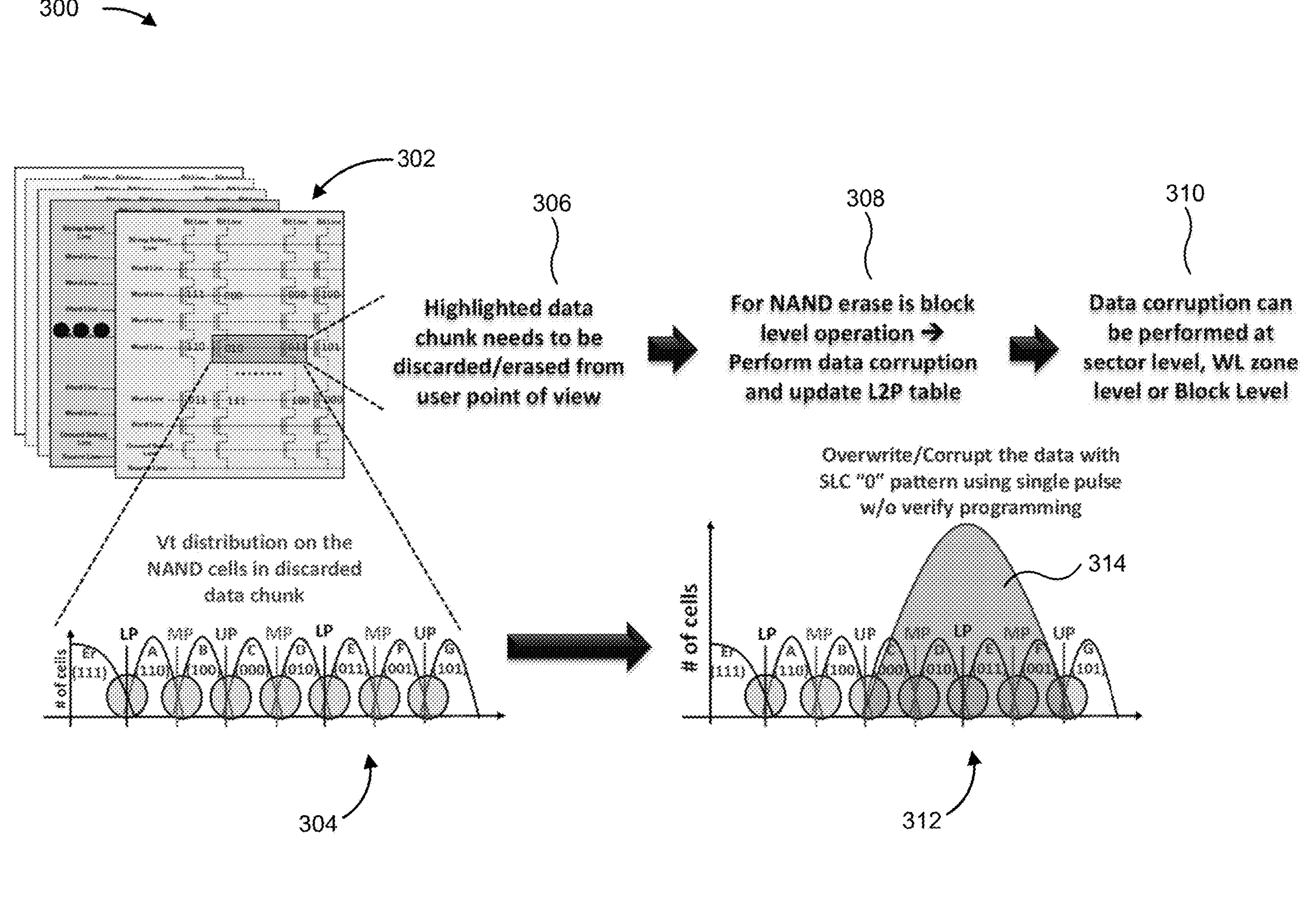
FIG. 3 is a schematic diagram of an example process associated with providing a programming pulse for data to be erased, in accordance with the present disclosure.

FIG. 3 illustrates an example process 300 for selectively corrupting data in a non-volatile memory device, such as a NAND flash memory system. As explained herein, the data may include data to be erased and the data may be corrupted by providing a programming pulse. The figure depicts a NAND flash block 302, which may be similar to the NAND flash block 124 described in FIG. 1. The NAND flash block 302 comprises multiple wordlines and bitlines arranged in a grid-like structure, forming individual memory cells at their intersections. In some implementations, one or more process blocks of FIG. 3 may be performed by a controller of an SSD.

As shown in FIG. 3, a voltage distribution of the memory cells of the NAND flash block 302 is illustrated as a voltage distribution 304, which represents the initial state of the memory cells in a data chunk that is to be discarded or erased. This voltage distribution may correspond to the threshold voltages of the memory cells, which determine the stored data values. In some implementations, the voltage distribution 304 may represent multiple bits per cell, such as in multi-level cell (MLC), triple-level cell (TLC), or quad-level cell (QLC) configurations.

The process 300 begins with operation 306, which involves receiving a command to perform an erase operation on data stored in the NAND flash block 302. This command may be issued by a host device or by the memory controller itself. The command identifies specific data chunks within the NAND flash block 302 that need to be erased or discarded from a user's perspective. In some aspects, the command may include information about the size and location of the data to be erased within the block.

Following the receipt of the erase command, the process 300 moves to operation 308. This operation involves two steps: performing data corruption and updating the L2P table. The data corruption step provides an additional layer of security beyond traditional erase methods. By corrupting the data before the physical erase operation, the system ensures that the information becomes immediately unreadable, even if the erase operation is delayed or interrupted.

The L2P table update in operation 308 is used to maintain the integrity of the memory system's addressing scheme. By updating the L2P table, the system ensures that the corrupted data is no longer accessible through normal read operations. This step may involve removing the mapping between the logical addresses used by the host device and the physical addresses in the NAND flash memory where the data was stored.

Operation 310 illustrates the flexibility of the data corruption process, which may be performed at various levels depending on the size and location of the data to be erased. These levels may include (1) a sector level, which includes corrupting data at the smallest addressable unit, typically 512 or 4096 bytes; (2) a wordline zone level, which includes corrupting data across multiple contiguous wordlines within the block; and (3) a block level, which includes corrupting data across the entire NAND flash block. The choice of corruption level may be determined based on the size of the data chunk identified by the erase command. For smaller data chunks, sector-level or wordline zone-level corruption may be more efficient, while larger data chunks may warrant block-level corruption.

In some implementations, the data corruption process may involve overwriting the target cells with a predetermined pattern. For example, a single-level cell (SLC) "0" pattern may be written using a single programming pulse without a verify programming operation. This approach ensures rapid corruption of the data while minimizing wear on the memory cells. Alternative embodiments may use different patterns or multiple programming pulses to achieve more thorough data corruption.

The result of the data corruption process (e.g., using the SLC "0" pattern) is illustrated in the voltage distribution 312. This distribution shows how the threshold voltages of the cells in the discarded data chunk have been altered as a result of overwriting the cells with the SLC "0" pattern. The corrupted voltage distribution 314 demonstrates that the data in the targeted cells has been effectively scrambled, making it irrecoverable through conventional means.

In some aspects, the programming pulse used for data corruption may be tailored based on the determined size of the data identified by the erase command. For example, larger data chunks may receive a longer duration programming pulse compared to smaller data chunks. This adaptive approach ensures efficient use of system resources while maintaining the effectiveness of the data corruption process.

After the data corruption and L2P table update are complete, the process 300 may proceed with a standard erase operation on the block. This erase operation may be performed immediately or may be scheduled for a later time, depending on system priorities and resource availability. The combination of immediate data corruption and subsequent physical erasure provides a more comprehensive approach to data security in non-volatile memory systems.

In alternative embodiments, the data corruption process may be further enhanced by incorporating additional security measures. For example, the system may employ multiple programming pulses with varying voltages or durations to create a more complex corruption pattern. Additionally, the corruption process may be combined with data scrambling techniques to further obfuscate the original information. The data scrambling techniques may include one or more of data substitution, data shuffling, data redaction, data encryption, pseudonymization, data masking, among other examples.

The process 300 illustrated in FIG. 3 may improve data security for non-volatile memory systems. By implementing selective data corruption in response to erase commands, the system provides immediate protection against unauthorized data access, even before the physical erase operation is completed. This approach addresses the vulnerabilities associated with traditional erase methods and enhances the overall security posture of the storage device throughout its lifecycle.

Figure 4:
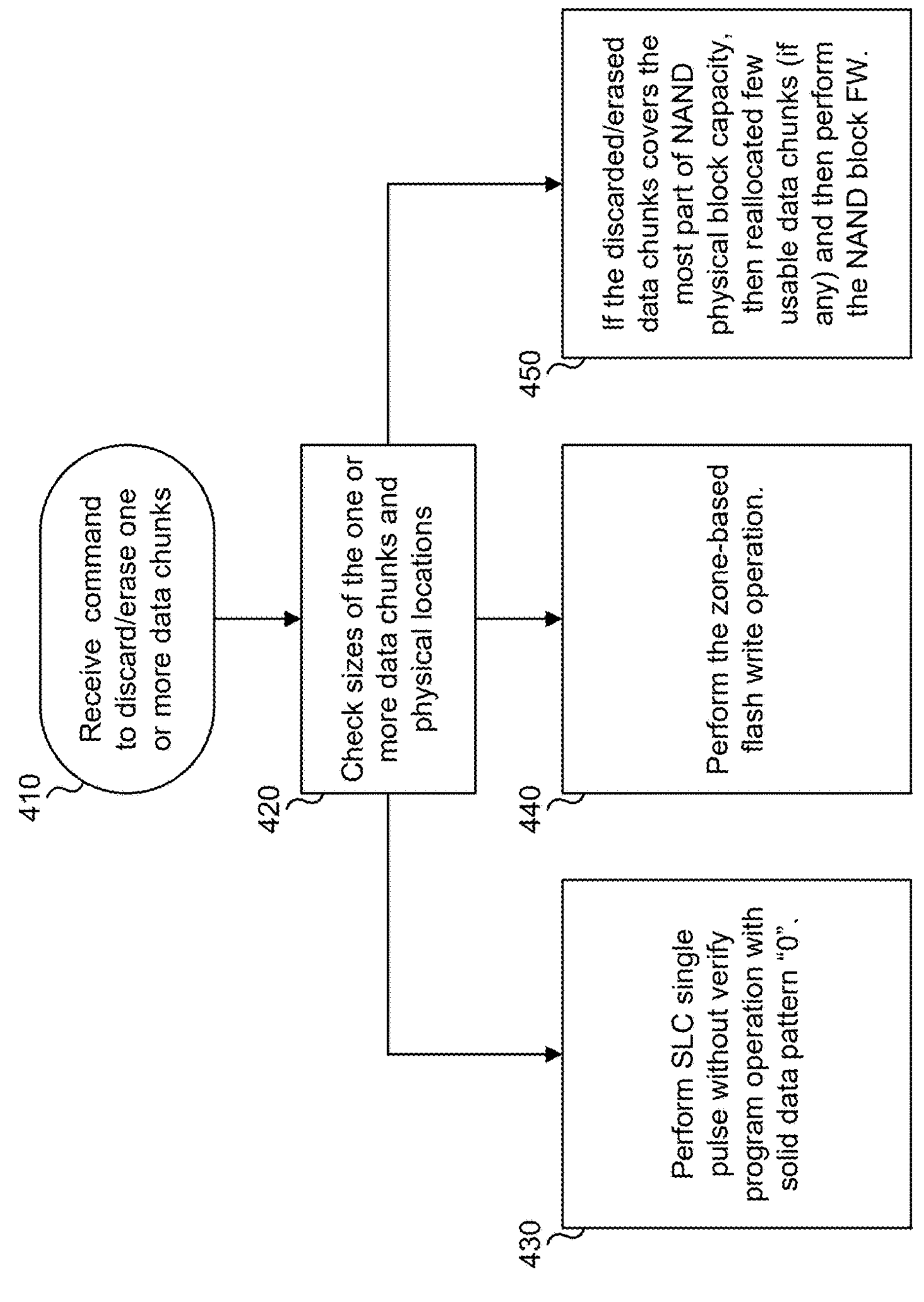
FIG. 4 is a flowchart of an example process associated with providing a programming pulse for data to be erased, in accordance with the present disclosure.

FIG. 4 is a flowchart of an example process associated with providing a programming pulse for data to be erased described herein. In some implementations, one or more process blocks of FIG. 4 may be performed by a controller of an SSD.

As shown in FIG. 4, a process 400 may include receiving a command to discard/erase one or more data chunks (block 410). For example, the controller may receive the command from a host. For instance, the host may issue the command to discard/erase one or more data chunks, as described herein.

The process 400 may include checking sizes of the one or more data chunks and physical locations (block 420). For example, the controller (of the SSD) may check sizes of the one or more data chunk and physical locations of the one or more data chunks, as described herein. The controller may perform the checks to perform the actions described in the blocks described below.

The process 400 may include performing a SLC single pulse with solid data pattern "0" without a verify program operation. (block 430). For example, if the discarded/erased data chunk is very small (e.g., only partial part(s) of the physical block, such as a portion of a wordline), the controller may perform a SLC single pulse without a verify program operation with a solid data pattern "0," as described herein, so as to corrupt the data.

The process 400 may include performing a zone-based flash write operation (block 440). For example, if the discarded/erased data chunks belong to a few physical layers, such as multiple wordlines, the controller may reallocate some of the usable data chunks (if any) to another block and then perform the zone-based flash write operation, as described herein, to corrupt the data. As used herein, a "usable data chunk" may to refer to data that is not to be erased. In some examples, the usable data chunk may include data provided by the host. A "usable data chunk" may refer to valid data of a wordline which has revied to erase/invalid certain portion of the chunk. Continuing with respect to "usable data chunk," consider an SLC as an example. A wordline of the SLC may store 16 KB of host data. In some situations, 4 wordlines may store 512B, 1 kB, 1 kB, 256B of host data (or valid data). In this regard, instead of performing a data corruption operation on 4 individual SLC wordlines without verifying the data corruption, the valid data may be moved from the 4 wordlines to a new location. After moving the valid data, a data corruption operation may be performed on all 4 wordlines collectively without verifying the data corruption. Performing the data corruption operation on the 4 wordlines in this manner improves the speed of the data corruption operation. Additionally, moving the valid data to the new location will improve data reliability on those chunks (e.g., the valid data) as well.

The process 400 may include performing perform a block write operation (block 450). For example, if the discarded/erased data chunks covers the most part of physical block capacity, then the controller may reallocate a few usable data chunks (if any) and then perform a block write operation on the entire block, as described herein, to corrupt the data. In some implementations, the controller (or firmware) may determine that the block write operation is to be performed using a predetermined mathematical formulation or a look up table (table). In some examples, the controller may make the determination based on various factors, such as the NAND type, the data is stored in SLC/MLC/TLC?QLC or PLC, program erase cycle, a period of time during which the NAND block is written, a quantity of reads performed on that block, among other examples. In some implementations, the controller may perform the block write operation on the entire block if the discarded/erase data chunks cover at least 60 percent of the block.

Although FIG. 4 shows example blocks of the process 400, in some implementations, the process 400 may include additional blocks, fewer blocks, different blocks, or differently arranged blocks than those depicted in FIG. 4. Additionally, or alternatively, two or more of the blocks of the process 400 may be performed in parallel.

Figure 5:
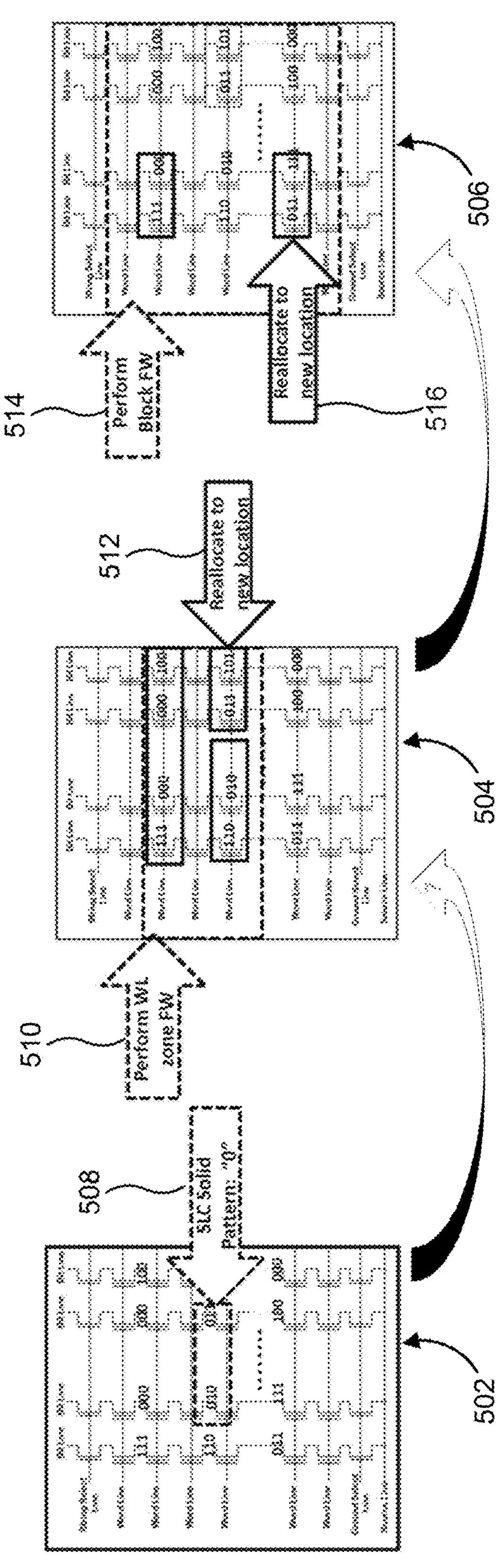
FIG. 5 is a schematic diagram associated with the example process of FIG. 4, in accordance with the present disclosure.

FIG. 5 is a schematic diagram associated with the example process of FIG. 4, in accordance with the present disclosure. FIG. 5 illustrates an example 500 of selective data corruption operations in a non-volatile memory device, such as a NAND flash memory system. The figure depicts three NAND flash blocks 502, 504, and 506, each representing different scenarios for data corruption based on the size and location of the data to be erased. These scenarios correspond to the process steps described in FIG. 4, demonstrating the practical implementation of the selective data corruption technique.

In NAND flash block 502, an SLC single pulse operation 508 is performed. This operation may be executed when the controller receives a command to discard or erase a relatively small amount of data, such as a portion of a wordline. The SLC single pulse operation 508 involves applying a single-level cell programming pulse to a specific location within the block, effectively corrupting the data in a localized area while leaving other areas unaffected. This operation corresponds to step 430 in FIG. 4, where a single SLC pulse with a solid data pattern "0" is performed without a verify program operation. While a single SLC pulse operation is performed on one or more memory cells of the portion of the wordline, the one or more memory cells may include one or more MLC cells, one or more TLC cells, one or more QLC cells, or a combination of the foregoing. In other words, while a single SLC pulse operation may be performed, the one or more memory cells may be different than SLC cells. In some examples, a single MLC pulse operation may be performed one or more memory cells different than MLC cells. In some examples, a single TLC pulse operation may be performed one or more memory cells different than TLC cells. In some examples, a single QLC pulse operation may be performed one or more memory cells different than QLC cells.

NAND flash block 504 demonstrates a zone-based flash write operation 510, which may be employed when the data to be erased spans multiple wordlines but does not occupy the entire block. This operation corresponds to step 440 in FIG. 4. Prior to the zone-based flash write, a reallocation operation 512 is performed to move any usable data from the target zone to a new location, preserving important information. The term "zone-based flash write operation", as used herein, may refer to a process of writing predetermined data to a specific region or zone within a NAND flash block, typically encompassing multiple wordlines. For example, in some cases, a zone may consist of 16 or 32 contiguous wordlines within a block. The zone-based flash write operation may be used to write data to a larger portion of a block compared to a single SLC pulse. The zone based flash write operation may also be an SLC write operation where many physical worldlines are shorted together and drive by one programming charge pump. In some examples, the predetermined data may include a solid data pattern "0" (as described herein).

NAND flash block 506 illustrates a block flash write operation 514, which corrupts data across the entire block. This operation corresponds to step 450 in FIG. 4 and is typically performed when the discarded or erased data chunks cover most of the physical block capacity. Before this operation, a reallocation operation 516 is executed to move any remaining usable data to a different block, ensuring no important information is lost during the corruption process. The term "block flash write operation", as used herein, may refer to a process of writing predetermined data to an entire NAND flash block. For example, in some implementations, a block may consist of 128 or 256 wordlines, and the block flash write operation would program all of these wordlines with the predetermined data pattern. The block flash write operation may be used to write data to a larger portion of a block compared to a single SLC pulse or compared to zone-based flash write operation. In some examples, the predetermined data may include a solid data pattern "0" (as described herein).

The arrows between the blocks indicate the progression of operations and the increasing scale of data corruption from localized (block 502) to zone-based (block 504) to full-block (block 506). This visual representation demonstrates the flexibility of the selective data corruption approach, allowing for different levels of data erasure based on the size and location of the data to be removed, as determined in step 420 of FIG. 4.

In alternative embodiments, the selective data corruption technique may incorporate additional features to enhance security and efficiency. For instance, the system may employ adaptive programming pulses that vary in duration based on the size of the data to be corrupted. In some implementations, the controller may use a combination of SLC, MLC (multi-level cell), TLC (triple-level cell), or QLC (quad-level cell) programming techniques to achieve more complex corruption patterns. Additionally, the system may implement intelligent wear-leveling algorithms to distribute the corruption operations evenly across the NAND flash blocks, thereby extending the overall lifespan of the non-volatile memory device.

The selective data corruption operations illustrated in FIG. 5 provide a more comprehensive approach to secure data erasure in non-volatile memory systems. By tailoring the corruption method to the specific characteristics of the data to be erased, the system ensures efficient use of resources while maintaining a high level of data security. This approach addresses the vulnerabilities associated with traditional erase methods by making the data immediately unreadable, even before the physical erase operation is completed. As a result, the risk of unauthorized access to discarded data is significantly reduced throughout the entire lifecycle of the storage device, including during active use and potential recycling phases.

Figure 6:
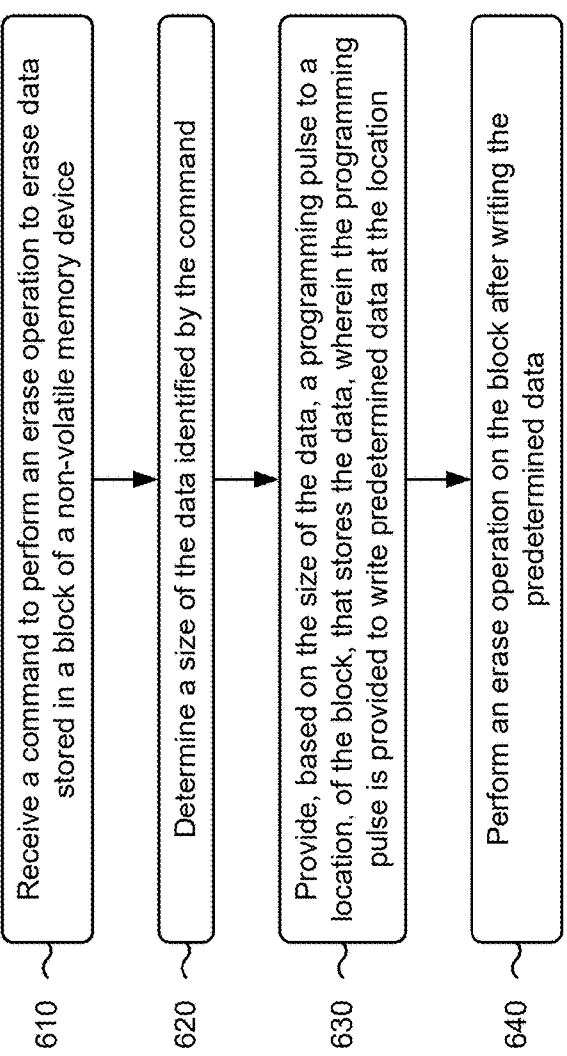
FIG. 6 is a flowchart of an example process associated with providing a programming pulse for data to be erased, in accordance with the present disclosure.

FIG. 6 is a flowchart of an example process 600 associated with a programming pulse to corrupt data to be erased. In some implementations, one or more process blocks of FIG. 6 may be performed by a controller. Additionally, or alternatively, one or more process blocks of FIG. 6 may be performed by one or more components of the device 200, such as the processor 220, the memory 230, the storage component 240, the input component 250, the output component 260, and/or the communication interface 270.

As shown in FIG. 6, the process 600 may include receiving a command to perform an erase operation to erase data stored in a block of a non-volatile memory device (block 610). For example, the controller may receive a command to perform an erase operation to erase data stored in a block of a non-volatile memory device, as described above in connection with block 410 of FIG. 4.

The process 600 may include determining a size of the data identified by the command (block 620). For example, the controller may determine a size of the data identified by the command, as described above in connection with block 420 of FIG. 4.

The process 600 may include providing, based on the size of the data, a programming pulse to a location, of the block, that stores the data, wherein the programming pulse is provided to write predetermined data at the location (block 630), so as to corrupt the data for which the command to erase was received. For example, the controller may provide, based on the size of the data, a programming pulse to a location, of the block, that stores the data, wherein the programming pulse is provided to write predetermined data at the location, as described above in connection with block 430 of FIG. 4 and in connection with FIG. 5. In some implementations, the programming pulse is provided to write predetermined data at the location. The programming pulse may include using an SLC "0" pattern using a single programming pulse.

The process 600 may include performing an erase operation on the block after writing the predetermined data (block 640). For example, the controller may perform an erase operation on the block after writing the predetermined data.

In some implementations, providing the programming pulse comprises providing a single-level cell (SLC) pulse to the location of the block, wherein the SLC pulse is provided based on the data including a portion of a wordline of the block.

In some implementations, providing the programming pulse comprises providing a quad-level cell (QLC) pulse to the location of the block, wherein the QLC pulse is provided based on the data including a portion of a wordline of the block.

In some implementations, determining the size of the data comprises determining that the data includes multiple wordlines of the block, and determining that the multiple wordlines include usable data that is not to be erased, and wherein the method comprises relocating the usable data to a different block of the non-volatile memory device prior to providing the programming pulse.

In some implementations, the multiple wordlines include less than an entirety of the block, and wherein providing the programming pulse comprises performing a write operation on the multiple wordlines, after relocating the data, based on the multiple wordlines including less than an entirety of the block.

In some implementations, the multiple wordlines include an entirety of the block, and wherein providing the programming pulse comprises performing a write operation on the entirety of the block, after relocating the data, based on the multiple wordlines including the entirety of the block.

In some implementations, providing the programming pulse comprises providing a multi-level cell (MLC) pulse to the location of the block, wherein the MLC pulse is provided based on the data including a portion of a wordline of the block.

Although FIG. 6 shows example blocks of the process 600, in some implementations, the process 600 may include additional blocks, fewer blocks, different blocks, or differently arranged blocks than those depicted in FIG. 6. Additionally, or alternatively, two or more of the blocks of the process 600 may be performed in parallel.

In some implementations, a method comprises receiving a command to perform an erase operation to erase data stored in a block of a non-volatile memory device; determining a size of the data identified by the command; providing, based on the size of the data, a programming pulse to a location, of the block, that stores the data, wherein the programming pulse is provided to write predetermined data at the location; and performing an erase operation on the block after writing the predetermined data.

In some implementations, a system comprises a controller, of a non-volatile memory device, to: receive a command to perform an erase operation to erase data stored in a block of a non-volatile memory device; determine a size of the data identified by the command; and provide, based on the size of the data, a programming pulse to a location, of the block, that stores the data, wherein the programming pulse is provided to write predetermined data at the location;

In some implementations, a non-transitory computer-readable medium storing a set of instructions includes one or more instructions that, when executed by one or more processors of a controller, cause the controller to: determine a size of data to be erased, wherein the data stored in a block of a non-volatile memory device identified by the command; and provide, based on the size of the data, a programming pulse to a location, of the block, that stores the data, wherein the programming pulse is provided to write predetermined data at the location based on a command to perform an erase operation at the location of the block.

As used herein, the term "component" is intended to be broadly construed as hardware, firmware, or a combination of hardware and software. It will be apparent that systems or methods described herein may be implemented in different forms of hardware, firmware, or a combination of hardware and software. The actual control hardware or software code used to implement these systems or methods is not limiting of the implementations. Thus, the operation and behavior of the systems or methods are described herein without reference to specific software code—it being understood that software and hardware can be used to implement the systems or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims or disclosed in the specification, these combinations are not intended to limit the disclosure of various implementations. In fact, many of these features may be combined in ways not specifically recited in the claims or disclosed in the specification. Although each dependent claim listed below may directly depend on only one claim, the disclosure of various implementations includes each dependent claim in combination with other claims in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein is to be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "or," unless explicitly stated otherwise (e.g., if used in combination with "either" or "only one of").

What is claimed is:

1. A method comprising:

receiving a command to perform an erase operation to erase data stored in a block of a non-volatile memory device;

determining a size of the data identified by the command;

providing, based on the size of the data, a programming pulse to a location, of the block, that stores the data, wherein the programming pulse is provided to write predetermined data at the location; and performing an erase operation on the block after writing the predetermined data.

2. The method of claim 1, wherein providing the programming pulse comprises providing a single-level cell (SLC) pulse to the location of the block, wherein the SLC pulse is provided based on the data including a portion of a wordline of the block.

3. The method of claim 1, wherein providing the programming pulse comprises:

providing a quad-level cell (QLC) pulse to the location of the block, wherein the QLC pulse is provided based on the data including a portion of a wordline of the block.

4. The method of claim 1, wherein determining the size of the data comprises:

determining that the data includes multiple wordlines of the block; and determining that the multiple wordlines include usable data that is not to be erased, and wherein the method comprises:

relocating the usable data to a different block of the non-volatile memory device prior to providing the programming pulse.

5. The method of claim 4, wherein the multiple wordlines include less than an entirety of the block, and wherein providing the programming pulse comprises:

performing a write operation on the multiple wordlines, after relocating the data, based on the multiple wordlines including less than an entirety of the block.

6. The method of claim 4, wherein the multiple wordlines include an entirety of the block, and wherein providing the programming pulse comprises:

performing a write operation on the entirety of the block, after relocating the data, based on the multiple wordlines including the entirety of the block.

7. The method of claim 1, wherein providing the programming pulse comprises:

providing a multi-level cell (MLC) pulse to the location of the block, wherein the MLC pulse is provided based on the data including a portion of a wordline of the block.

8. A system comprising:

a controller, of a non-volatile memory device, to:

receive a command to perform an erase operation to erase data stored in a block of a non-volatile memory device;

determine a size of the data identified by the command; and provide, based on the size of the data, a programming pulse to a location, of the block, that stores the data, wherein the programming pulse is provided to write predetermined data at the location.

9. The system of claim 8, wherein the controller is to perform an erase operation on the block after writing the predetermined data.

10. The system of claim 8, wherein, to provide the programming pulse, the controller is to:

provide a multi-level cell (MLC) pulse to the location of the block, wherein the MLC pulse is provided based on the data including a portion of a wordline of the block.

11. The system of claim 8, wherein, to provide the programming pulse, the controller is to:

provide a triple-level cell (TLC) pulse to the location of the block, wherein the TLC pulse is provided based on the data including a portion of a wordline of the block.

12. The system of claim 8, wherein, to provide the programming pulse, the controller is to:

provide a quad-level cell (QLC) pulse to the location of the block, wherein the QLC pulse is provided based on the data including a portion of a wordline of the block.

13. The system of claim 8, wherein, to determine the size of the data, the controller is to:

determine that the data includes multiple wordlines of the block; and determine that the multiple wordlines include usable data that is not to be erased, and wherein the controller is to:

relocate the usable data to a different block of the non-volatile memory device prior to providing the programming pulse.

14. The system of claim 13, wherein the multiple wordlines include less than an entirety of the block, and wherein, to provide the programming pulse, the controller is to:

perform a write operation on the multiple wordlines, after relocation of the usable data, based on the multiple wordlines including less than an entirety of the block.

15. The system of claim 13, wherein the multiple wordlines include an entirety of the block, and wherein, to provide the programming pulse, the controller is to:

perform a write operation on the entirety of the block, after relocating the data, based on the multiple wordlines including the entirety of the block.

16. A non-transitory computer-readable medium storing a set of instructions, the set of instructions comprising:

one or more instructions that, when executed by one or more processors of a controller, cause the controller to:

determine a size of data to be erased, wherein the data is stored in a block of a non-volatile memory device and identified by a command; and provide, based on the size of the data, a programming pulse to a location, of the block, that stores the data, wherein the programming pulse is provided to write predetermined data at the location based on a command to perform an erase operation at the location of the block.

17. The non-transitory computer-readable medium of claim 16, wherein the one or more instructions, that cause the controller to provide the programming pulse, cause the controller to:

provide a single-level cell (SLC) pulse to the location of the block, wherein the SLC pulse is provided based on the data including a portion of a wordline of the block.

18. The non-transitory computer-readable medium of claim 16, wherein the one or more instructions, that cause the controller to determine the size of the data, cause the controller to:

determine that the data includes multiple wordlines of the block; and determine that the multiple wordlines include usable data that is not to be erased, and wherein the one or more instructions further cause the controller to:

relocate the usable data to a different block of the non-volatile memory device prior to providing the programming pulse.

19. The non-transitory computer-readable medium of claim 18, wherein the multiple wordlines include less than an entirety of the block, and wherein the one or more instructions, that cause the controller to provide the programming pulse, cause the controller to:

perform a write operation on the multiple wordlines, after relocating the usable data, based on the multiple wordlines including less than an entirety of the block.

20. The non-transitory computer-readable medium of claim 19, wherein the multiple wordlines include an entirety of the block, and wherein the one or more instructions, that cause the controller to provide the programming pulse, cause the controller to:

perform a write operation on the entirety of the block, after relocating the data, based on the multiple wordlines including the entirety of the block.

* * * * *